Patented Nov. 13, 1951

2,574,832

UNITED STATES PATENT OFFICE 2,574,832

ADDUCTS OF 1-ALKENES WITH POLY-HALOGENATED ALKANES

Morris S. Kharasch, Chicago, Ill., assignor to United States Rubber Company, New York, N. Y., a corporation of New Jersey No Drawing. Application April 5, 1947, Serial No. 739,662

11 Claims. (Cl. 260—593)

This invention deals with the preparation of aldehydes and ketones by a novel process comprising the steps of causing a halogenated hydocarbon containing two chlorine atoms and one bromine atom attached to a terminal carbon atom to react with an unsaturated organic compound containing a terminal $CH_2=C<$ group so as to form predominantly a one-to-one adduct in which one carbon atom has attached thereto two chlorine atoms and is in turn attached to one of the carbon atoms which constituted part of said terminal $CH_2=C<$ group and a bromine atom is attached to the other carbon atom which constituted part of said $CH_2=C<$ group and subjecting said adduct to hydrolyzing conditions whereby hydrogen halides are eliminated therefrom so as to form compounds having the type formula

wherein X represents an unsaturated organic radical and Y is chosen from the group consisting of organic radicals and hydrogen.

In my co-pending application, Serial No. 696,941, filed September 13, 1946, now U. S. Patent No. 2,468,208, there is disclosed the reaction between dichlorobromomethane and simple aliphatic olefines to form simple one-to-one adducts which on hydrolysis yield unsaturated aldehydes. I have now found that this reaction may be extended to include the use of other halogenated hydrocarbons which contain two chlorine atoms and one bromine atom attached to the same terminal carbon atom. Such compounds are, for example, $CH_3CCl_2Br$ (1,1 - dichloro - 1 - bromoethane), $CH_3CH_2CCl_2Br$ (1,1 - dichloro-1-bromopropane), $CH_3CH_2CH_2CCl_2Br$ (1,1 - dichloro - 1 - bromobutane), $(CH_3)_2CH—CH_2CCl_2Br$ (1,1 - dichloro-1-bromo - 3 - methylbutane), $CH_3(CH_2)_7-CCl_2Br$ (1,1-dichloro-1-bromononane) and may be generalized as including all those having the type formula $RCCl_2Br$ wherein R is a saturated aliphatic hydrocarbon radical. These compounds can be prepared from the corresponding tri-chloromethyl alkyl compounds, e. g., those having the type formula $RCCl_3$ by reacting the trichloromethyl compound with a suitable quantity of an alkyl bromide in the presence of a Friedel-Crafts catalyst such as aluminum chloride or bromide. Suitable trichloromethyl compounds include those having the type formula $H(CH_2CH_2)_nCCl_3$ which may be prepared from chloroform and ethylene by the so-called "telomerization" reaction disclosed in Br. Pat. 581,899.

Other halogenated hydrocarbons containing two chlorine atoms and one bromine atom attached to the same terminal carbon atom suitable for use in my invention comprise the one-to-one adducts prepared by subjecting to free radical reaction conditions a reaction mixture containing an unsaturated organic compound containing a terminal $CH_2=C<$ group and dichlorodibromomethane. The resultant halogenated hydrocarbons may be generalized as being those having the type formula

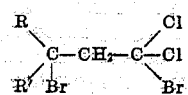

wherein R represents hydrogen or an organic group and R' represents hydrogen or an alkyl group.

When mixtures comprising as one reactive component thereof a halogenated hydrocarbon containing two chlorine atoms and one bromine atom attached by primary valence bonds to the same terminal carbon atom and comprising as another reactive component thereof an unsaturated organic compound containing a terminal $CH_2=C<$ group are subjected to free radical reaction conditions there are formed useful bromine containing halo organic compounds. These compounds contain two chlorine atoms attached to one carbon atom and a bromine atom attached to a different carbon atom.

The aforementioned reaction mixture is subjected to free radical reaction conditions either by irradiating the mixture with actinic light or by heating the reaction mixture with a substance which is capable of acting as a catalyst for ethylene polymerization but which is ineffective as a catalyst for the Friedel-Crafts reaction. Suitable catalysts are enumerated in U. S. P. 2,402,137. Of these catalysts I prefer to use the diacyl peroxides such as, for example, diacetyl peroxide and dibenzoyl peroxide. When diacyl peroxides are employed as the catalysts, the temperature to which the reaction mixture is heated should be sufficient to decompose the peroxide. In general, temperatures between room temperature (20° C.) and about 150° C. are preferred.

It is preferred to have in the reaction mixture somewhat more than one molecular weight of the halogenated hydrocarbon for each molecular weight of the unsaturated organic compound. In practice there are employed from one to twenty or more molecular weights of the halogenated hydrocarbons for each molecular weight of the olefinic compound.

The time of reaction is not critical but should be sufficient at the temperature employed to give an appreciable yield of the desired adduct. In general, reaction times of from two to fifty or more hours are employed although longer reaction times may be employed if desired. By an appreciable amount of the desired adduct I mean any amount of the adduct which is separable from the reaction mix by the usual chemical means such as distillation or extraction.

The one-to-one adducts of the unsaturated organic compounds and the halogenated hydrocarbons may be separated from the other components present in the reaction mixture by the usual chemical processes as, for example, by distillation under atmospheric or reduced pressure. These adducts are convertible by hydrolysis into either unsaturated ketones or aldehydes. The adducts are thus distinguished from the adducts of either chloroform, carbon tetrachloride, or trichlorobromomethane with olefinic compounds since these latter adducts are converted by hydrolysis into acids.

Dichlorobromomethane adds to unsaturated organic compounds containing a terminal $$CH_2=C<$$

group, and in particular to acyclic 1-alkene hydrocarbons to form adducts which are convertible by hydrolysis to unsaturated aldehydes. Halogenated aliphatic hydrocarbons containing at least two carbon atoms and in which two chlorine atoms and one bromine atom are attached to the same carbon atom add to the same type of unsaturated organic compounds to form adducts which are hydrolyzable to unsaturated ketones.

The addition under free radical reaction conditions of dichlorodibromomethane to olefines is unique as compared to the behavior of other tetrahalomethanes in such reactions. Dichlorodibromomethane adds to olefines to form one-to-one adducts which contain two chlorine atoms and one bromine atom attached to the same carbon atom and these adducts may be separated from the reaction mixture and caused to react with an olefin which need not be the same olefin as was used to react with the dichlorodibromomethane. By this reaction there will be produced adducts which are hydrolyzable to unsaturated ketones.

Dibromodichloromethane also adds to olefines to form two-to-one adducts, that is to say, compounds containing in chemical combination the atoms from two molecules of olefin and one of dibromodichloromethane. These two-to-one adducts are distinguished from the so-called "telomers" obtained by the reaction between olefines and other tetrahalomethanes in that my two-to-one adducts are hydrolyzable to unsaturated ketones whereas the so-called "telomers" of carbon tetrachloride and chloroform are hydrolyzed to acids.

For a more complete understanding of the methods of carrying out my invention and the results obtained thereby, reference is made to the following examples.

When a mixture of bromodichloromethane, octene-1 and a catalytic amount of diacetyl peroxide is heated at 70° C. for six hours, 1,1-dichloro-3-bromononane is obtained in 80% yield. Hydrolysis of this halide yields 2-nonenal. Similarly, the reaction of bromodichloromethane with isobutene gives 1,1 - dichloro - 3 - bromo-3-methylbutane which can be hydrolyzed to $\beta,\beta$-dimethylacrolein.

In the same type of reaction, vinyl acetate and bromodichloromethane give 1-bromo-3,3-dichloropropyl acetate. Derivatives of $\beta,\beta$-dichloropropionaldehyde are prepared directly from this ester. Propylene and bromodichloromethane give 1,1-dichloro-3-bromo-butane which gives crotonaldehyde upon hydrolysis.

The stepwise reaction of one mole of dibromodichloromethane with two moles of olefin yields halides which can be hydrolyzed to substituted divinyl ketones.

(1)
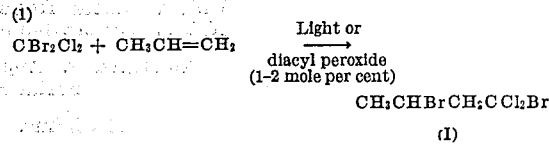

(2)
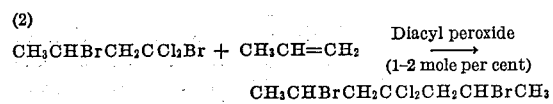

The light- or peroxide-initiated addition of dibromodichloromethane to propylene yields 1,1-dichloro-1,3-dibromobutane (I). Further reaction of (I) with propylene gives 2,6-dibromo-4,4-dichloroheptane. 2,6-dibromo-4,4-dichlorododecane is produced by the reaction of (I) with octene-1.

EXAMPLE I

*The reaction of bromodichloromethane with propylene in the presence of diacetyl peroxide*

A solution of diacetyl peroxide (2.2 gr.) in bromodichloromethane (167.4 gr.; B. P. 88° C.; $n_D^{20}=1.4962$) is placed in the stainless steel bomb of a modified Parr hydrogenation apparatus. After evacuating and flushing the system several times with propylene, the reaction mixture is heated to 60° C. under a propylene pressure of 45 pounds. These conditions are maintained for 12 hours, and propylene is slowly consumed.

The reaction mixture is distilled through an 8 inch Vigreux column. After unreacted bromodicloromethane (B. P. 25-28° C. at 30 mm.; 115 gr.) is removed, 1,1-dichloro-3-bromobutane (B. P. 75–76° at 30 mm.; 33.3 gr.; $n_D^{20}=1.4912$) distills.

Anal. calc'd for $C_4H_7BrCl_2$: Silver equivalent, 68.3. Found, 68.5.

A high-boiling residue (11.3 gr.) remains in the distilling flask.

*Proof of structure of 1,1-dichloro-3-bromobutane*

Sodium (19 gr.; 0.84 mole) is added in small pieces to ethylene glycol (250 ml.) held at a temperature of 90° C. After all of the sodium has disappeared, the bromodichloromethane-propylene addition product (30 gr.; 0.145 mole) is added over a period of 20 minutes with stirring. The temperature of the reaction mixture is maintained at 110° C. for 5 hours. During this time, a heavy white precipitate appears.

The reaction mixture is acidified with dilute hydrochloric acid, and the resulting solution is distilled under vacuum. An aqueous solution (73 ml.) distills. An aliquot of this solution (5 ml.) is treated with 2,4-dinitrophenyl hydrazine reagent. The crimson precipitate which forms is shown to be the 2,4-dinitrophenyl hydrazone of crotonaldehyde (M. P. 189° C., after recrystallization from a benzene-ligroin mixture; mixed M. P. with authentic sample, 189° C.). The weight of this derivative (0.4523 gr.) corresponds to a total yield of crotonaldehyde of 2.9 grams (28% of theory).

EXAMPLE 2

*The reaction of bromodichloromethane with octene-1 in the presence of diacetyl peroxide*

A solution of diacetyl peroxide (5.4 gr.) in bromodichloromethane (30 gr.) is dropped over a period of two hours into a solution of octene-1 (56 gr.) in bromodichloromethane (387 gr.) held at 75° C. To complete the reaction, the reaction mixture is maintained at 75° C. for three more hours.

After unreacted bromodichloromethane has been removed by distillation, a fraction (112.6 gr.; $n_D^{20}=1.4842$) distills at 65° C. at 0.03 mm. This substance is shown to be 1,1-dichloro-3-bromononane. (Yield, 82% of theory.)

Anal. calc'd for $C_9H_{17}BrCl_2$; Ag equivalent, 92.0. Found, 91.7.

A high-boiling residue (17.5 gr.) is left in the still pot. This residue probably contains higher polymers with more than one octene unit per bromodichloromethane.

*Proof of structure of 1,1-dichloro-3-bromononane*

The bromodichloromethane-octene-1 addition product (96.0 gr.; 0.35 mole) is slowly dropped into a vigorously stirred solution of sodium ethylate (prepared by the reaction of sodium, 46 gr., with absolute ethanol, 500 ml.). Heat is evolved during the addition, and a heavy white solid is precipitated. After the addition is complete, the reaction mixture is heated under reflux for ten hours.

After the reaction mixture has cooled, precipitated salts are removed on a filter, and the filtrate is acidified with acetic acid. The mixture is then warmed to 50° C., and maintained at this temperature for two hours. After cooling, the mixture is added to water (1 liter). The oily layer which separates is taken up in ligroin (35° C.), and the water layer is extracted with three additional portions of ligroin (300 ml. each). The combined extract is washed with water, sodium carbonate solution (5%), and then again with water. It is dried over anhydrous sodium sulfate.

After the ligroin has been removed from the extract, a brown oil remains which is distilled at reduced pressure. The first fractions (11.0 gr.; B. P. 30–51° C. at 0.2 mm.) are composed of halogen-containing substances which are not identified. Then, 2-nonenal (29.2 gr.; B. P. 55–57° C. at 0.2 mm.; $n_D^{20}=1.4499$; yield, 60% of theory) distills. This substance is converted to its 2,4-dinitrophenyl hydrazone (M. P. 124° C.; mixed M. P. with authentic sample, 124.5–125° C.). 2-nonenal (B. P. 56–58° C. at 0.2 mm.; $n_D^{20}=1.4502$) was made for comparison by the method of Scanlan and Swern. (J. Am. Chem. Soc., 62, 2309 (1940).)

EXAMPLE 3

*Reaction of bromodichloromethane with isobutylene in the presence of diacetyl peroxide*

A solution of diacetyl peroxide (2 gr.) in bromodichloromethane (100 gr.) is treated with isobutylene in the Parr apparatus using the conditions already described for the bromodichloromethane-propylene reaction.

The reaction mixture is distilled through a small Vigreux column. After unreacted bromodichloromethane (B. P. 26–28° C. at 32 mm.; 54.8 gr.) is removed, 1,1-dichloro-3-bromo-3-methylbutane (34.0 gr.; B. P. 75–78° C. at 12 mm.; $n_D^{20}=1.4960$) distills.

Anal. calc'd for $C_5H_9BrCl_2$: Ag equivalent, 73.3. Found, 72.0.

A small residue (3.4 gr.) remains in the distilling flask.

*Proof of the structure of 1,1-dichloro-3-bromo-3-methylbutane*

The bromodichloromethane-isobutylene addition product (14 gr.) is slowly added to a strongly stirred sodium ethylate solution (made by dissolving sodium, 9 gr., in 200 ml. of absolute ethanol). A vigorous reaction which heats the reaction mixture to the boiling point ensues, and a white precipitate appears. The reaction mixture is heated under reflux for 12 hours, and then allowed to cool.

Precipitated salt (9.5 gr.) are separated upon a Buchner filter, and the filtrate is distilled at reduced pressure through a 12-plate fractionating column to remove the ethanol. When the volume of the undistilled mixture reaches about 50 ml., ligroin (35° C.; 200 ml.) is added. The ligroin solution is washed with water, dilute hydrochloric acid, and again with water. It is dried over anhydrous sodium sulfate.

The ligroin solution is distilled. After the ligroin has been removed, a brown oil remains. It distills from 60° C. to 70° C. at 50 mm. pressure (6 gr.; $n_D^{20}=1.4446$). When this oil is treated with 2,4-dinitrophenylhydrazine reagent, dark red crystals form. These are shown to be the 2,4-dinitrophenyl hydrazone of $\beta,\beta$-dimethylacrolein (M. P. 178° C., after three recrystallizations from ethyl acetate; mixed M. P. with authentic sample, 178–178.5° C.). For comparison purposes, $\beta,\beta$-dimethylacrolein was made by the method of Fischer, Ertel and Lowenberg. (Ber., 64B, 30 (1931).)

EXAMPLE 4

*The reaction of vinyl acetate with bromodichloromethane in the presence of diacetyl peroxide*

A solution of diacetyl peroxide (2.5 gr.) in bromodichloromethane (30 gr.) is added in increments during a period of 4 hours to a solution containing vinyl acetate (50 gr.) and bromodichloromethane (375 gr.) the temperature being maintained at 65° C. The reaction mixture is maintained at this temperature for another 2 hours after the addition is complete.

After unreacted vinyl acetate and bromodichloromethane have been distilled (B. P. 40–48° C. at 100 mm.), an oily product remains. High vacuum distillation of this oil yields 1-bromo-3,3-dichloropropyl acetate (B. P. 58° C. at 0.2 mm.; 60 gr.; $n_D^{20}=1.4782$). The yield is quantitative on the basis of the vinyl acetate consumed in the reaction.

Anal. calc'd for $C_5H_7O_2BrCl_2$: Ag equivalent, 83.3. Found, 82.0.

A residue (16.5 gr.) remained in the distilling flask.

When this addition product (1 gr.) is added to a solution of 2,4-dinitrophenyl hydrazine (1.5 gr.) in ethanol (95%; 35 ml.) containing concentrated hydrochloric acid (2 ml.), orange needle-like crystals (1.5 gr.) precipitate. This product gives the correct chlorine analysis for the 2,4-dinitrophenyl hydrazone of $\beta,\beta$-dichloropropionaldehyde (M. P. 162-162.5° C. after two recrystallizations from ethanol).

Anal. calc'd for $C_9H_8N_4O_4Cl_{22}$; Cl. 23.09. Found, Cl, 22.89.

EXAMPLE 5

*The reaction of dibromodichloromethane with propylene in the light*

Dibromodichloromethane (300 gr.; B. P. 66–67° C. at 95 mm.; $n_D^{20}=1.5509$) is placed in a reaction vessel illuminated internally by a mercury-neon coil. Propylene is slowly bubbled through the solvent for a period of fifty hours. The heat from the light maintains the reaction mixture at 50° C.

The reaction mixture is distilled through a short Vigreux column. After unreacted dibromodichloromethane has been removed, 1,1-dichloro-1,3-dibromobutane (B. P. 47–48° C. at 0.2 mm.; $n_D^{20}=1.5370$; 145.5 gr.) distills. A residue (4.5 gr.) remains in the distilling flask.

This dibromodichloromethane-propylene addition product is also prepared by carrying out the reaction in the presence of diacetyl peroxide in the Parr apparatus.

EXAMPLE 6

*The reaction of 1,1-dichloro-1,3-dibromobutane with propylene in the presence of diacetyl peroxide*

A solution of diacetyl peroxide (2 gr.) in 1,3-dibromo-1,1-dichlorobutane (120.0 gr.) is shaken with propylene (40 pounds pressure) for 10 hours at 80° C. During this time, propylene (0.2 mole) is consumed.

After unreacted solvent has been removed from the reaction mixture, a fraction (B. P. 76–80° C. at 0.05 mm.; 38.5 gr.; $n_D^{20}=1.4282$) distills which is probably 2,6-dibromo-4,4-dichloroheptane.

Anal. calc'd for $C_7H_{12}Br_2Cl_2$: Ag equivalent, 81.7. Mol. wt., 327.

Found: Ag equivalent, 82.0. Mol. wt., 321.

EXAMPLE 7

*The reaction of 1,1-dichloro-1,3-dibromobutane with octene-1 in the presence of diacetyl peroxide*

A solution of diacetyl peroxide (2 gr.) in 1,1-dichloro-1,3-dibromobutane (285 gr.; 0.69 mole) and octene-1 (20.0 gr.; 0.18 mole) is held at 70° for 10 hours, then at 100° C. for 3 hours.

The reaction mixture is then distilled. First, octene-1 (6.0 gr.; 32–40° C. at 43 mm.) was recovered, and then unreacted solvent (206.0 gr.; 0.52 mole; B. P. 62–67° C. at 1 mm.) distilled. The residue is distilled in a molecular still. Three fractions having the same refractive index ($n_D^{20}=1.5119$) distill. This substance is probably 2,6-dibromo-4,4-dichlorododecane (41.2 gr.; conversion 60%). The yield is quantitative on the basis of the octene consumed in the reaction.

Anal. calc'd for $C_{12}H_{22}Cl_2Br_2$: Ag equivalent, 99.2. Mol. wt. 397.

Found, Ag equivalent, 99.5. Mol wt. 394.

It can thus be seen that the free radical catalyzed addition to olefines and substituted olefines of halogenated hydrocarbons containing two chlorine atoms and at least one bromine atom attached to the same carbon atom is a novel and useful synthetic method yielding many novel and hitherto unknown halogenated bromine containing organic compounds which are hydrolyzable to form a large variety of useful organic carbonyl compounds such as unsaturated aldehydes and ketones.

Thus my invention provides not only a method for making new and useful halogenated organic compounds but also provides a new and useful method for producing unsaturated ketones, aldehydes and derivatives thereof.

These unsaturated ketones and aldehydes may be employed as chemical intermediates in the production of a variety of products including dyes, pharmaceuticals, perfumes and plastics.

Since many variations may be made in the specific methods disclosed herein without departing from the spirit of my invention, reference is made to the appended claims for a delineation of the true scope of my invention.

Having thus described my invention, what I claim and desire to protect by Letters Patent is:

1. Process of producing useful bromine-containing chlorinated organic compounds which comprises subjecting a reaction mixture containing as one reactive component a 1-alkene and containing as another reactive component a halogenated alkane containing only two chlorine atoms and one bromide atom attached to the same carbon atom which in turn is linked to a radical from the class consisting of hydrogen, alkyl, bromine and bromalkyl, to reaction in the presence of a reaction initiator from the class consisting of free radicals formed by the action on the mixture of actinic light, and free radicals formed by the action on the mix of a diacyl peroxide.

2. A process as in claim 1 wherein the halogenated alkane is dichlorobromomethane.

3. A process as in claim 1 wherein the halogenated alkane has the type formula

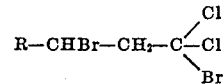

R being an alkyl radical.

4. A process as in claim 1 wherein the halogenated alkane has the type formula

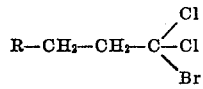

R being an alkyl radical.

5. Process of producing organic carbonyl compounds which comprises subjecting a reaction mixture containing as one reactive component a 1-alkene and containing as another reactive component a halogenated alkane containing only two chlorine atoms and one bromine atom attached to the same carbon atom which in turn is linked to a radical from the class consisting of hydrogen, alkyl, bromine and bromalkyl, to reaction in the presence of a reaction initiator from the class consisting of free radicals formed by the action on the mixture of actinic light, and free radicals formed by the action on the mix of a diacyl peroxide, and forming an appreciable amount of the one-to-one adduct of the 1-alkene and the halogenated alkane, separating said adduct from the other components of the reaction mixture, and subjecting said adduct to dehydrobrominating and hydrolyzing conditions.

6. Process of producing aldehydes which comprises subjecting a reaction mixture containing as one reactive component a 1-alkene and containing as another reactive component dichlorobromomethane, to reaction in the presence of a reaction initiator from the class consisting of free radicals formed by the action on the mixture of actinic light, and free radicals formed by the action on the mix of a diacyl peroxide, and forming an appreciable amount of the one-to-one adduct of said 1-alkene and dichlorobromomethane, separating said adduct from other hydrolyzable components of the reaction mixture, and subjecting said adduct to dehydrobrominating and hydrolyzing conditions.

7. Process of producing ketones which comprises subjecting a reaction mixture containing as one reactive component a 1-alkene and containing as another reactive component a halogenated alkane having the type formula

where A represents a bromalkyl radical, to reaction in the presence of a reaction initiator from the class consisting of free radicals formed by the action on the mixture of actinic light, and free radicals formed by the action on the mix of a diacyl peroxide, and forming an appreciable quantity of the one-to-one adduct having the formula $A\text{—}CCl_2B$ where A and B each represent bromoalkyl, separating said adduct from the other components of the reaction mixture, and subjecting said adduct to dehydrobrominating and hydrolyzing conditions.

8. As new compositions of matter, the one-to-one adducts of dichlorobromomethane and acylic 1-alkene hydrocarbons which adducts have the general formula $A\text{—}CCl_2H$ where A represents monobromoalkyl having at least two carbon atoms, and are characterized by being convertible by dehydrobromination and hydrolysis to unsaturated aldehydes.

9. As new compositions of matter, the one-to-one adducts of acyclic 1-alkene hydrocarbons with saturated halogenated hydrocarbons having the formula $A\text{—}CBrCl_2$, where A represents bromoalkyl, which adducts contain at least 4 carbon atoms and have the general formula $A\text{—}CCl_2B$, where A and B each represent bromoalkyl, and are characterized by being convertible by dehydrobromination and hydrolysis to unsaturated ketones.

10. A process as in claim 1 wherein the halogenated alkane is dichlorodibromomethane.

11. A process as in claim 1 wherein the halogenated hydrocarbon has the type formula

where A is bromoalkyl.

MORRIS S. KHARASCH.

REFERENCES CITED

The following references are of record in the file of this patent:

UNITED STATES PATENTS

| Number | Name | Date |
|---|---|---|
| 2,322,258 | Strosacker et al. | June 22, 1943 |
| 2,359,459 | Anderson et al. | Oct. 3, 1944 |
| 2,398,430 | Joyce | Apr. 16, 1946 |
| 2,410,541 | Joyce | Nov. 5, 1946 |

FOREIGN PATENTS

| Number | Country | Date |
|---|---|---|
| 581,899 | Great Britain | Oct. 29, 1946 |

OTHER REFERENCES

Kharasch et al., Science, vol. 102, No. 2640, page 128, Aug. 3, 1945.

Beilstein, "Handbuch der Organischen Chemie," vol. I, pages 90, 111, 121, Berlin, 1918.